United States Patent [19]

Thayer et al.

[11] Patent Number: 5,281,656
[45] Date of Patent: Jan. 25, 1994

[54] COMPOSITION TO INCREASE THE RELEASE FORCE OF SILICONE PAPER RELEASE COATINGS

[75] Inventors: LeRoy E. Thayer; John D. Jones, both of Midland; Eugene D. Groenhof, Freeland, all of Mich.

[73] Assignee: Dow Corning Corporation, Midland, Mich.

[21] Appl. No.: 998,493

[22] Filed: Dec. 30, 1992

[51] Int. Cl.$^5$ .............................................. C08L 67/00
[52] U.S. Cl. ...................... 524/601; 528/15; 524/773; 525/478; 427/503; 427/568; 427/387
[58] Field of Search ................. 528/15; 524/601, 773; 525/478; 427/503, 568, 387

[56] References Cited

U.S. PATENT DOCUMENTS

| | | | |
|---|---|---|---|
| 2,823,218 | 2/1958 | Speier et al. | 260/448.2 |
| 3,159,601 | 12/1964 | Ashby | 260/46.5 |
| 3,159,602 | 12/1964 | Hamilton et al. | 260/61 |
| 3,220,972 | 11/1965 | Lamoreaux | 260/46.5 |
| 3,296,291 | 1/1967 | Chalk et al. | 260/448.2 |
| 3,344,111 | 9/1967 | Chalk | 260/46.5 |
| 3,418,731 | 12/1968 | Anclaux | 36/30 |
| 3,419,593 | 12/1968 | Willing | 260/448.2 |
| 3,445,420 | 5/1969 | Kookoostedes et al. | 260/37 |
| 3,461,185 | 8/1969 | Brown | 260/825 |
| 3,516,946 | 6/1970 | Modic | 252/429 |
| 3,814,730 | 6/1974 | Karstedt | 260/46.5 |
| 3,855,052 | 12/1974 | Mestetsky | 161/167 |
| 3,882,083 | 5/1975 | Berger et al. | 260/46.5 |
| 3,928,629 | 12/1975 | Chandra et al. | 427/387 |
| 3,989,667 | 11/1976 | Lee et al. | 260/46.5 |
| 4,043,977 | 8/1977 | deMontigny et al. | 260/46.5 |
| 4,061,609 | 12/1977 | Bobear | 260/9 |
| 4,154,714 | 5/1979 | Hockemeyer et al. | 260/31.2 |
| 4,190,688 | 2/1980 | Traver et al. | 427/391 |
| 4,256,870 | 3/1981 | Eckberg | 528/15 |
| 4,337,332 | 6/1982 | Melancon et al. | 528/15 |
| 4,340,647 | 7/1982 | Eckberg | 528/15 |
| 4,340,709 | 7/1982 | Jeram et al. | 528/15 |
| 4,347,346 | 8/1982 | Eckberg | 528/15 |
| 4,465,818 | 8/1984 | Shirahata et al. | 528/12 |
| 4,472,563 | 9/1984 | Chandra et al. | 528/15 |
| 4,476,166 | 10/1984 | Eckberg | 427/387 |
| 4,525,566 | 6/1985 | Homan et al. | 528/17 |
| 4,533,575 | 8/1985 | Melancon | 427/387 |
| 4,562,096 | 12/1985 | Lo et al. | 427/208.8 |
| 4,609,574 | 9/1986 | Keryk et al. | 427/407.1 |
| 4,774,111 | 9/1988 | Lo | 427/387 |
| 5,036,117 | 7/1991 | Chung et al. | 522/172 |

FOREIGN PATENT DOCUMENTS

| | | | |
|---|---|---|---|
| WO8912549 | 12/1989 | European Pat. Off. | B32B 5/16 |
| 0409229A2 | 7/1990 | European Pat. Off. | C08L 83/07 |
| 2113015 | 4/1990 | Japan | C08G 18/61 |

*Primary Examiner*—Melvyn I. Marquis
*Attorney, Agent, or Firm*—Timothy J. Troy

[57] ABSTRACT

The present invention relates to coating compositions comprising a vinyl- or higher alkenyl-enblocked polydiorganosiloxane, a silicon-bonded hydrogen endblocked polydiorganosiloxane, a platinum catalyst, and an inhibitor which increase the release force of pressure sensitive adhesives (PSA's) adhered thereto. The compositions of the present invention can additionally comprise an organohydrogenpolysiloxane crosslinker. The present invention further relates to a method of release control by crosslink density (or bulk modulus) control.

30 Claims, No Drawings

COMPOSITION TO INCREASE THE RELEASE FORCE OF SILICONE PAPER RELEASE COATINGS

BACKGROUND OF THE INVENTION

The present invention relates to coating compositions which increase the release force of pressure sensitive adhesives (PSA's) adhered thereto. The present invention further relates to a method of release control by crosslink density (or bulk modulus) control.

In the field of pressure sensitive release materials a perennial problem has been achieving elevated release forces (tighter release) coupled with smooth nonrapsy release. Current technology uses an $R_3SiO_{\frac{1}{2}}$ or $SiO_2$ (wherein R is a monovalent hydrocarbon radical) resin to give elevated release. The problem with this approach is that the profile of release against delaminating speed is often totally unsatisfactory with release forces being lower at high speeds than at low. This leads to converting problems with small labels or high speed converting. This problem is especially pertinent to 100% solids materials.

There are instances when there is a need in the paper coatings industry for a composition which provides increased release values at high delamination speeds. For example, in a process for preparing pressure sensitive labels a laminate of adhesive-bearing label stock and silicone-bearing backing paper is die cut on its label stock side to provide a plurality of labels surrounded by a waste matrix, both still adhered to the backing paper. The waste matrix is typically rapidly stripped away and discarded, leaving only the die-cut labels adhered to the uncut backing paper. For such a process it is highly desirable that the force required to separate the adhesive from the coating be sufficiently low to allow easy stripping of the waste matrix but sufficiently high to retain the labels on the backing paper during the stripping operation. Another example of when high release force is required in the paper coatings industry is in the preparation of rolls of pressure sensitive adhesive tape a support material, such as paper or polymeric film, is provided with a cured silicone release coating and a pressure sensitive adhesive coating. The resulting stock is rolled into a roll configuration so that the adhesive coating is adhered to the silicone release coating over substantially its entire surface. In such a product the force required to separate the adhesive from the coating should be sufficiently low to allow the easy unwinding of the roll of tape, when desired, but sufficiently high to retain the tape in the roll configuration during the preparing, storing, and handling of the roll. Compositions which control the release force of silicone paper release coatings have been described in the art. For example, Mestetsky, U.S. Pat. No. 3,855,052, teaches a controlled release coating composition comprising an organic solvent solution of an organopolysiloxane and a solvent soluble polymer of a polymerizable unsaturated aliphatic dibasic acid or derivative thereof. Mestetsky also teaches that incremental changes in the proportion of said solvent soluble polymer lead to incremental changes in the release force of the coatings produced with such compositions. A typical composition of the '052 patent consists of toluene, polydimethylsiloxane, and a copolymer of maleic anhydride and alkylvinyl ether.

Traver et al., U.S. Pat. No. 4,190,688 teaches a paper release coating emulsion composition comprising a vinyl-containing polymer, a hydride crosslinking agent, water, and an emulsifying agent which when applied to kraft paper gave release paper with good release properties.

Homan et al., U.S. Pat. No. 4,525,566, discloses moisture-curable silicone compositions for adhesive release coatings comprising an alkoxysilylorganosiloxane, a titanium ester, and an aminoorganosiloxane having an adhesive release force, when cured, which is directly related to the amount and type of aminoorganosiloxane. It is further disclosed that the compositions are useful for coating a flexible sheet material, such as paper or polymeric film, to provide a surface that will release pressure sensitive adhesive with a pre-selected release force of up to 400 g/in (154 N/m).

In unexamined published Japanese patent application No. (JP-A-No.) 2113015, it is disclosed that polyurethane resin release agents produced by reacting a polyol component containing at least partially copolymers comprising active hydrogen containing siloxane compounds and caprolactones, a polyisocyanate component, and chain extenders, are useful for rendering of releasability to the back faces of adhesive tapes and adhesive sheets, and the surface of release paper.

Hulme et. al., PCT Application No. 8912549, teaches a release liner for use with pressure sensitive adhesives comprising a liner substrate having a release coating derived from a blend of an aqueous emulsion of a curable vinyl addition silicone polymer and a particle component which is preferably a resin. The polymer system comprises vinyl silicone polymer and silicone hydride crosslinker, catalyzed by a group VIII metal catalyst, preferably platinum. Hulme et al. further teaches that the release force or peel at a variety of peel rates can be controlled by the silicon particle ratio, the nature of the particles used, the degree of interaction of the two, and the crosslink density of the cured silicone and coating weight.

Coating compositions having vinyl-endblocked polydiorganosiloxanes have been described in the art. Hockemeyer et al. in U.S. Pat. No. 4,154,714 teaches coating compositions which impart adhesive repellent or non-adherent properties to substrates coated therewith comprising (1) vinyl endblocked diorganopolysiloxanes having an average viscosity in excess of $10^6$ cP at 25° C. in which from 3 to 39 percent of the nonterminal siloxane units are diphenylsiloxane units and at least 50 mole percent of the remaining organic radicals on the siloxane units are methyl radicals, (2) organopolysiloxanes having at least 3 Si-bonded hydrogen atoms per molecule, (3) catalysts which promote the addition of Si-bonded hydrogen atoms to the vinyl groups, and (4) an inert organic solvent. Also Jeram et al. in U.S. Pat. No. 4,340,709 discloses an addition curing silicone composition with a low viscosity in the uncured state and high physical strength in the uncured state comprising a vinyl-containing diorganopolysiloxane polymer, a platinum catalyst, a hydride crosslinking agent and a linear hydride coupler in which the viscosity of the linear hydride coupler varies from 1 to 500 centipoise at 25° C.

Alkenyl polydiorganosiloxanes have also been taught. Okami et al., in European Patent Application No. EPO 409229 teaches an addition type curable silicone rubber composition comprising (a) 100 parts by weight organopolysiloxanes containing 2 or more alkenyl groups bonded to Si atoms in one molecule, (b) 3 to 70 parts by weight of organopolysiloxanes containing one alkenyl group bonded to Si atom in one molecule on average, (c) organohydrogenpolysiloxanes containing two or more H bonded to Si atoms in one molecule in an amount providing 0.5 to 5 H bonded to Si atoms per 1 alkenyl group of (a) and (b), and (d) a catalytic amount of a platinum compound.

Other release coatings described in the art which employ compositions containing olefinic hydrocarbon radicals, silicon-bonded hydrogen atoms, and inhibitors in a metal catalyzed reaction are taught in U.S. Pat. Nos. 4,562,096, 4,609,574, 4,774,111, and 5,036,117. However none of these references disclose a composition which includes olefinic hydrocarbon-endblocked and silicon-bonded hydrogen-endblocked polysiloxanes in combination to increase the release force of silicone paper release coatings at high delaminating speeds.

As stated hereinabove, there is a need for improved silicone release coatings wherein their adhesive-release forces can be increased when desired and also maintain release stability. The present invention is therefore directed to the use of siloxane polymers to increase the release force of solventless paper release coatings while maintaining stable release control.

BRIEF SUMMARY OF THE INVENTION

It is an object of the present invention to decrease the crosslink density of commercial paper release coatings so that increased release forces are achieved. It is also an object of the present invention to provide silicone release coating compositions which increase the release force of solventless paper release coatings at high delamination speeds while maintaining acceptable viscosity levels and workable curing speeds. It is a further object of the present invention to provide a method for controlling release forces in pressure sensitive adhesive laminate compositions. It is a further object of the present invention to provide silicone release coatings which require a smaller quantity of polysiloxane compounds than do present high release additives and are therefore more efficient.

These objects, and others which will occur to one of ordinary skill in the curable organosilicon composition art upon considering the following disclosure and appended claims, are obtained by the present invention which, briefly stated, comprises a curable coating composition comprising a polydiorganosiloxane polymer endblocked with olefinic hydrocarbon radicals, a siloxane polymer having at least three silicon-bonded unsaturated organic groups per molecule, a silicon-bonded hydrogen endblocked polysiloxane, a platinum group metal-containing catalyst, and an inhibitor. The curable coating composition may additionally comprise an organohydrogenpolysiloxane crosslinking agent. Subsequently a pressure sensitive adhesive composition is applied to the cured coating to form an adhesive/release coating interface. The force that is required to separate the adhesive from the release coating is determined by the amount and type of siloxane polymers that are employed.

Without limiting the present invention to any particular theory it is believed that the population of crosslinks must be decreased in order to decrease the modulus of the coating. To accomplish this, terminal vinyl or higher alkenyl functional and terminal SiH functional silicone polymers were added to the coating to increase the average distance between crosslinking centers.

DETAILED DESCRIPTION OF THE INVENTION

The present invention relates to compositions which increase the release force of silicone paper release coatings, the composition comprises a curable coating composition comprising (A) a polydiorganosiloxane having the general formula $XR_2SiO(R_2SiO)_aSiR_2X$ wherein R denotes a monovalent hydrocarbon or halohydrocarbon radical free of aliphatic unsaturation and having 1 to 20 carbon atoms, X denotes an olefinic hydrocarbon radical having from 2 to 20 carbon atoms, at least 50 percent of R being methyl, and a has an average value of 1 to 1000, (B) a siloxane polymer having at least 3 silicon-bonded unsaturated organic groups per molecule and having the general formula $YR^1_2SiO(R^1_2SiO)_b(R^1YSiO)_cSiR^1_2Y$ wherein $R^1$ denotes a monovalent hydrocarbon or halohydrocarbon radical free of aliphatic unsaturation and having 1 to 20 carbon atoms, Y denotes an olefinic hydrocarbon radical having from 2 to 20 carbon atoms, at least 50 percent of $R^1$ being methyl, b has an average value of 1 to 500, and c has an average value of 1 to 100, (C) a polysiloxane having the general formula $HR^2_2SiO(R^2_2SiO)_dSiR^2_2H$ wherein $R^2$ denotes a monovalent hydrocarbon or halohydrocarbon radical free of aliphatic unsaturation and having from 1 to 20 carbon atoms, at least 50 percent of $R^2$ being methyl, and d has an average value of 1 to 1000, (D) a platinum group metal-containing catalyst, and (E) an inhibitor compound. The composition may additionally comprise an organohydrogenpolysiloxane crosslinking agent, the organohydrogenpolysiloxane crosslinking agent being selected from the group consisting of $(R^3_3SiO)_4Si$, $(MeHSiO)_4$, $R^3Si(OSiR^3_3)_3$, $(R^3_3SiO(Me_2SiO)_5)_4Si$, $(R^3_3SiO(MeHSiO)_7(Me_2SiO)_2)_4Si$, and an organohydrogenpolysiloxane having the general formula $ZR^3_2SiO(Me_2SiO)_x(MeR^4SiO)_y(MeHSiO)_zSiR^3_2Z$ wherein $R^3$ denotes a monovalent hydrocarbon or halohydrocarbon radical free of aliphatic unsaturation and having from 1 to 20 carbon atoms, Z denotes a hydrogen atom or an $R^3$ radical, at least 50 percent of $R^3$ being methyl, $R^4$ denotes a monovalent hydrocarbon or halohydrocarbon radical free of aliphatic unsaturation and having from 1 to 20 carbon atoms, x has an average value of 0 to 500, y has an average value of 0 to 500, and z has an average value of 1 to 100.

Herein the term "curable", as applied to compositions of this invention, generally denotes a chemical change which leads to a change in the state of the composition from a liquid to an elastomer. For the coating compositions produced by the process of this invention which are used as adhesive-release coatings the term "curable" has a more detailed meaning which encompasses the absence of smear, migration, and rub-off of the coating, as delineated below.

Components (A) and (C) of the present invention act as chain extenders for the compositions of this invention. Herein the term "chain extender", as applied to the compositions of this invention, is denoted as a composition which decreases the crosslink density and modulus of a curable coating composition.

The curing of the compositions of the present invention is accomplished by a reaction between silicon-bonded olefinic hydrocarbon radicals in Component (A) and Component (B) and the silicon-bonded hydrogen atoms in Component (C). The curing of the compositions of this invention is controlled by the platinum group metal-containing catalyst Component (D), and the inhibitor Component (E). The components are delineated as follows.

Component (A) of the compositions of this invention is a polydiorganosiloxane having the general formula $XR_2SiO(R_2SiO)_aSiR_2X$ wherein R denotes a monovalent hydrocarbon or halohydrocarbon radical free of aliphatic unsaturation and having 1 to 20 carbon atoms, X denotes an olefinic hydrocarbon radical having from 2 to 20 carbon atoms, at least 50 percent of R being methyl, and a has an average value of 1 to 1000. The value of the subscript a in the formula $XR_2SiO(R_2SiO)_aSiR_2X$ is such that the polydiorganosiloxane of Component (A) has a viscosity at 25° C. of at least 25 millipascal-seconds (25 centipoise). The exact value of a that is needed to provide a viscosity value meeting said limit depends on the identity of the X and R radicals. Preferably a has a value of from 100 to 800.

The monovalent radicals in Component (A) can contain up to 20 carbon atoms and include halohydrocarbon radicals free of aliphatic unsaturation and hydrocarbon radicals. Monovalent hydrocarbon radicals include alkyl radicals, such as methyl, ethyl, propyl, butyl, hexyl, and octyl; cycloaliphatic radicals, such as cyclohexyl; aryl radicals, such as phenyl, tolyl, and xylyl; aralkyl radicals, such as benzyl and phenylethyl. Highly preferred monovalent hydrocarbon radical for the silicon-containing components of this invention are methyl and phenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. Preferred monovalent halohydrocarbon radicals have the formula $C_nF_{2n+1}CH_2CH_2-$ wherein the subscript n has a value of from 1 to 10, such as, for example, $CF_3CH_2CH_2-$ and $C_4F_9CH_2CH_2-$. The several R radicals can be identical or different, as desired and preferably at least 50 percent of all R radicals are methyl.

Polydiorganosiloxanes most useful as Component (A) in the compositions of this invention are polydiorganosiloxane polymers having a viscosity at 25° C. of at least 25 centistokes. It is preferred that the polymer has a viscosity at 25° C. of 100 to 1000 centistokes so that the coating compositions containing the polymer can be easily applied to substrates without adding significant amounts of solvent. It is even more preferred that the polymer have a viscosity at 25° C. of 200 to 600 centistokes so that solventless coating compositions containing the polymer not soak into or penetrate substrates such as paper to an undesirable degree and will provide more durable cured coatings.

The polymers useful as component (A) in the compositions of this invention are made up of diorganosiloxane units of the formula $R'_2SiO$ and chain terminating unit of the formula $R_2'R''SiO_\frac{1}{2}$ wherein R' denotes a methyl radical and R" denotes a hydrocarbon radical containing terminal unsaturation. The olefinic hydrocarbon radicals of the present invention may have from 2 to 20 carbon atoms. The olefinic hydrocarbon radicals are preferably selected from the group consisting of the vinyl radical and higher alkenyl radicals represented by the formula $-R(CH_2)_mCH=CH_2$ wherein R denotes $-(CH_2)_n-$ or $-(CH_2)_pCH=CH-$ and m has the value of 1, 2, or 3, n has the value of 3 or 6, and p has the value of 3, 4, or 5. The higher alkenyl radicals represented by the formula $-R(CH_2)_mCH=CH_2$ contain at least 6 carbon atoms. For example, when R denotes $-(CH_2)_n-$, the higher alkenyl radicals include 5-hexenyl, 6-heptenyl, 7-octenyl, 8-nonenyl, 9-decenyl, and 10-undecenyl. When R denotes $-(CH_2)_pCH=CH-$, the higher alkenyl radicals include, among others, 4,7-octadienyl, 5,8-nonadienyl, 5,9-decadienyl, 6,11-dodecadienyl and 4,8-nonadienyl. Alkenyl radicals selected from the group consisting of 5-hexenyl, 7-octenyl, 9-decenyl, and 5,9-decadienyl, are preferred. It is more preferred that R denote $-(CH_2)_n-$ so that the radicals contain only terminal unsaturation and the most preferred radicals are the vinyl radical and the 5-hexenyl radical.

Specific examples of preferred polydiorganosiloxanes for use as Component (A) in the compositions of the present invention include $ViMe_2SiO(Me_2SiO)_xSiMe_2Vi$, $HexMe_2SiO(Me_2SiO)_xSiMe_2Hex$, $PhMeViSiO(Me_2SiO)_xSiPhMeVi$, $HexMe_2SiO(Me_2SiO)_{130}SiMe_2Hex$, $ViMePhSiO(Me_2SiO)_{145}SiPhMeVi$, $ViMe_2SiO(Me_2SiO)_{299}SiMe_2Vi$, $ViMe_2SiO(Me_2SiO)_{800}SiMe_2Vi$, $ViMe_2SiO(Me_2SiO)_{300}SiMe_2Vi$, and $ViMe_2SiO(Me_2SiO)_{198}SiMe_2Vi$, wherein Me, Vi, Hex, and Ph denote methyl, vinyl, 5-hexenyl and phenyl, respectively.

While the polydiorganosiloxanes of Component (A) are described as linear and to bear only hydrocarbon radicals on silicon, it is within the scope and spirit of this invention to permit the presence of therein of trace amounts of non-linear siloxane units i.e. $SiO_2$, and $R'SiO_{3/2}$, wherein R' is as described above, and trace amounts of other silicon-bonded radicals, such as hydroxyl or alkoxyl, which are normally incidentally in commercial polydiorganosiloxanes. Preferably, the polydiorganosiloxanes of Component (A) are free of the non-linear siloxane units and the other radicals.

Component (B) of the compositions of this invention is a siloxane polymer having at least 3 silicon-bonded unsaturated organic groups per molecule and having the general formula $YR^1_2SiO(R^1_2SiO)_b(R^1YSiO)_cSiR^1_2Y$ wherein $R^1$ denotes a monovalent hydrocarbon or halohydrocarbon radical free of aliphatic unsaturation and having 1 to 20 carbon atoms, Y denotes an olefinic hydrocarbon radical having from 2 to 20 carbon atoms, at least 50 percent of $R^1$ being methyl, b has an average value of 1 to 500, and c has an average value of 1 to 100. Monovalent radicals in Component (B) include monovalent hydrocarbon and halohydrocarbon radicals free of aliphatic unsaturation as delineated above for Component (A), including preferred examples. The monovalent radicals that are present in Component (B) are preferably, but need not be, the same as the monovalent radicals that are present in Component (A).

Olefinic hydrocarbon radicals in Component (B) include olefinic hydrocarbon radicals as delineated above for Component (A), including preferred examples. The olefinic hydrocarbon radicals that are present in Component (B) are preferably, but need not be, the same as the olefinic hydrocarbon radicals that are present in Component (A). The value of the subscripts b and c in the formula $YR^1_2SiO(R^1_2SiO)_b(R^1YSiO)_cSiR^1_2Y$ are such that the siloxane polymer of Component (B) has a viscosity at 25° C. of at least 25 millipascal-seconds (25 centipoise). The exact value of b and c that is needed to provide a viscosity value meeting said limit depends on the identity of the $R^1$ and Y radicals. Preferably for the compositions of the present invention b has a value of from 10 to 200, and c has a value of from 1 to 10.

In a preferred embodiment of the present invention, wherein the curable composition is used to coat a solid substrate, such as paper, with an adhesive release coating, the value of b plus c in the formula $YR^1_2SiO(R^1_2SiO)_b(R^1YSiO)_cSiR^1_2Y$ is sufficient to provide a viscosity at 25° C. for the Component (B) of at least 100 mPa·s such as from about 100 mPa·s to about 100 Pa·s, preferably from about 100 mPa·s to 10 Pa·s, and most preferably from 50 mPa·s to 1000 mPa·s. The viscosities corresponding approximately to values of b+c of at least 60, such as from 60 to 1000, preferably 60 to 520 and, most preferably, 60 to 420, respectively. In addition, the value of subscript c is preferably limited to less than 0.1b.

Specific examples of preferred siloxane polymers useful as component (B) include $HexMe_2SiO(Me_2SiO)_b$-$(MeHexSiO)_cSiMe_2Hex$, $ViMe_2SiO(Me_2SiO)_b(MeViSiO)_cSiMe_2Vi$, $HexMe_2SiO(Me_2SiO)_{196}(MeHexSiO)_4$-$SiMe_2Hex$, $HexMe_2SiO(Me_2SiO)_{198}(MeHexSiO)_2$-$SiMe_2Hex$, $HexMe_2SiO(Me_2SiO)_{151}(MeHexSiO)_3$-$SiMe_2Hex$, and $ViMe_2SiO(Me_2SiO)_{96}(MeViSiO)_2$-$SiMe_2Vi$, wherein Me, Vi, and Hex denote methyl, vinyl, and 5-hexenyl.

Component (C) of the compositions of this invention is a polysiloxane having the formula $HR^2_2SiO(R^2_2SiO)_dSiR^2_2H$ wherein $R^2$ denotes a monovalent hydrocarbon or halohydrocarbon radical free of aliphatic unsaturation and having from 1 to 20 carbon atoms, at least 50 percent of $R^2$ being methyl, and d has an average value of from 1 to 1000. The value of the subscript d in the formula $HR^2_2SiO(R^2_2SiO)_dSiR^2_2H$ is such that the polysiloxane of Component (C) has a viscosity at 25° C. of at least 5 millipascal-seconds (centipoise). The exact value of d that is needed to provide a viscosity value meeting said limit depends on the identity of the $R^2$ radical. Preferably d has a value of from 1 to 500 for the compositions of the present invention.

Monovalent radicals in Component (C) include monovalent hydrocarbon and halohydrocarbon radicals free of aliphatic unsaturation as delineated above for Component (A), including preferred examples. The monovalent radicals that are present in Component (C) are preferably, but need not be, the same as the monovalent radicals that are present in Component (A).

Polysiloxanes most useful as Component (C) in the compositions of this invention are silicon-bonded hydrogen endblocked polymers having a viscosity at 25° C. of at least 25 millipascal-seconds. It is preferred that the polymer have a viscosity at 25° C. of up to 500 millipascal-seconds so that the coating compositions containing the polymer can be easily applied to substrates without adding significant amounts of solvent. It is even more preferred that the polymer have a viscosity at 25° C. of up to 100 millipascal-seconds so that solventless coating compositions containing the polymer will not soak into or penetrate substrates such as paper to an undesirable degree and will provide more durable cured coatings.

The polymers are made up of diorganosiloxane units of the formula $R'_2SiO$ and chain terminating unit of the formula $HR'_2SiO\frac{1}{2}$ wherein R' denotes a methyl radical or other hydrocarbon radical. Generally the R' radicals in the polymers are 90 to 99.5 mole percent methyl radicals. Examples of silicon-bonded hydrogen endblocked polydiorganosiloxanes which are suitable as Component (C) in the present invention include $HMe_2SiO(Me_2SiO)_dSiMe_2H$, $HMe_2SiO(Me_2SiO)_{13}SiMe_2H$, $HMe_2SiO(Me_2SiO)_{15}SiMe_2H$, $HMe_2SiO(Me_2SiO)_{50}SiMe_2H$, $HMe_2SiO(Me_2SiO)_{100}SiMe_2H$, $HMe_2SiO(Me_2SiO)_{150}SiMe_2H$, $HMe_2SiO(Me_2SiO)_{200}SiMe_2H$, and $HMe_2SiO(Me_2SiO)_{400}SiMe_2H$, wherein Me denotes methyl.

The amounts of Components (A), (B) and (C) that are used in the compositions of this invention are not narrowly limited. Said amounts, expressed in terms of the ratio of the number of silicon-bonded hydrogen atoms of Component (C) to the number of silicon-bonded olefinic hydrocarbon radicals of Components (A) and (B), are sufficient to provide a value of from $\frac{1}{4}$ to 20/1 for said ratio and, preferably, from $\frac{1}{2}$ to 2/1. For the liquid coating compositions of this invention the value of said ratio should have a value of from $\frac{1}{2}$ to 2/1 and, preferably, about 1/1.

Component (D) of the compositions of this invention can be any platinum group metal-containing catalyst component which facilitates the reaction of the silicon-bonded hydrogen atoms of Components (C) with the silicon-bonded olefinic hydrocarbon radicals of Components (A) and (B). By platinum group it is meant herein ruthenium, rhodium, palladium, osmium, iridium and platinum.

Component (D) is preferably a platinum containing catalyst component since they are the most widely used and available and because they provide a more favorable effect for the compositions of this invention in terms of improved release force. Platinum-containing catalysts can be a compound or complex of a platinum group metal. A preferred platinum-containing catalyst component in the compositions of this invention is a form of chloroplatinic acid, either as the commonly available hexahydrate form or as the anhydrous form, as taught by Speier, U.S. Pat. No. 2,823,218, incorporated herein by reference. A particularly useful catalyst is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems. Other platinum catalysts which are thought to be useful in the present invention include those disclosed in U.S. Pat. Nos. 3,159,601; 3,159,602; 3,220,972; 3,296,291; 3,516,946; 3,814,730 and 3,928,629, incorporated herein by reference. The amount of platinum group metal-containing catalyst component that is used in the compositions of this invention is not narrowly limited as long as there is a sufficient amount to accelerate a room temperature reaction between the silicon-bonded hydrogen atoms of Component (C) with olefinic hydrocarbon radicals of Component (A) and (B) and not so much as to make its action uncontrollable by the use of Component (E) (described hereinbelow). The exact necessary amount of this catalyst component will depend on the particular catalyst utilized and is not easily predictable. However, for platinum containing catalysts the amount can be as low as one part by weight of platinum for every one million parts by weight of organosilicon Component (A). Preferably the amount is at 50 to 250 parts by weight of platinum for every one million parts by weight of silicon.

Component (E) of the compositions of this invention is any material that is known to be, or can be, used as an inhibitor for the catalytic activity of platinum group metal-containing catalysts. By the term "inhibitor" it is meant herein a material that retards the room temperature curing of a curable mixture of Components (A), (B), (C), and (D), when incorporated therein in small amounts, such as less than 10 percent by weight of the composition, without preventing the elevated curing of the mixture.

Inhibitors for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. Nos. 3,445,420 and 4,347,346; ethylenically unsaturated isocyanates, U.S. Pat. No. 3,882,083; olefinic siloxanes, U.S. Pat. No. 3,989,667; unsaturated hydrocarbon diesters, U.S. Pat. Nos. 4,256,870; 4,476,166 and 4,562,096, and conjugated ene-ynes, U.S. Pat. Nos. 4,465,818 and 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; and various salts, such as U.S. Pat. No. 3,461,185. It is believed that the compositions of this invention can comprise an inhibitor from any of these classes of inhibitors.

Organic inhibitor compounds which bear aliphatic unsaturation and one or more polar groups, such as carbonyl or alcohol groups, display useful bath life extension benefits. Examples thereof include the acetylenic alcohols of Kookootsedes and Plueddemann, U.S. Pat. No. 3,445,420, such as ethynylcyclohexanol and methylbutynol; the unsaturated carboxylic esters of Eckberg, U.S. Pat. No. 4,256,870, such as diallyl maleate and dimethyl maleate; and the maleates and fumarates of Lo, U.S. Pat. Nos. 4,562,096 and 4,774,111, such as diethyl fumarate, diallyl fumarate, and bis-(methoxyisopropyl) maleate. The half esters and amides of Melancon, U.S. Pat. No. 4,533,575; and the inhibitor mixtures of Eckberg, U.S. Pat. No. 4,476,166 would also be expected to behave similarly. The above-mentioned patents relating to inhibitors for platinum group metal-containing catalysts are incorporated herein by reference to teach how to prepare compounds which are suitable for use as Component (E) in the compositions of this invention. Maleates and fumarates are the preferred inhibitors for the compositions of this invention.

The maleates and fumarates that are preferred as Component (E) in the compositions of this invention have the formula $R^5(OQ)_tO_2CCH=CHCO_2(QO)_tR^5$ wherein $R^5$ denotes a monovalent hydrocarbon radical having from 1 to 10 carbon atoms and each Q denotes, independently, an alkylene radical having from 2 to 4 carbon atoms. $R^5$ can be, for example, an alkyl radical such as methyl, ethyl, propyl, isopropyl, butyl, pentyl, or hexyl; an aryl radical such as phenyl or benzyl; an alkenyl radical such as vinyl or allyl; alkynyl radicals; or a cyclohydrocarbon radical such as cyclohexyl. Q can be for example, $-CH_2CH_2-$, $-CH_2(CH_3)CH-$, $-CH_2CH_2CH_2-$, $-CH_2CH_2CH_2CH_2-$, $-CH_2(CH_3CH_2)CH-$ and $-CH_2CH_2(CH_3)CH-$. The individual $R^5$ radicals and Q radicals of the maleates and fumarates can be identical or different, as desired. The value of subscript t in the formula immediately above can a value equal to zero or 1. The individual values of t can be identical or different, as desired. For the compositions of this invention, when the polydiorganosiloxane Component (A) containing olefinic hydrocarbon radicals, the siloxane polymer of Component (B), and the maleates and/or fumarates, are combined with Component (C), provide a superior release force. Bis-methoxyisopropyl maleate and diethyl fumarate are preferred as inhibitors for the present invention.

The amount of Component (E) to be used in the compositions of this invention is not critical and can be any amount that will retard the above described catalyzed reaction at room temperature while not preventing said reaction at elevated temperature. No specific amount of inhibitor can be suggested to obtain a specified bath life at room temperature since the desired amount of any particular inhibitor to be used will depend upon the concentration and type of the platinum group metal containing catalyst, the nature and amounts of Components (A), (B) and (C) and the presence or absence of optional ingredients. A practical range appears to be 0.5 to 1.05 percent of the total formulation for a maleate inhibitor and 0.8 to 2.0 percent of the total formulation for a fumarate inhibitor. Greater amounts of maleates and fumarates can be used if desired; however, drifting or long cure times may result. The compositions of the present invention can additionally comprise a bath life extender composition such as those described in Chung et al., U.S. Pat. No. 5,036,117 incorporated herein by reference. A preferred bath life extender compound for the present invention is benzyl alcohol or n-octanol. Highly preferred for the present invention is a combination of diethyl fumurate as the inhibitor complexed with benzyl alcohol as the bath life extender. We have generally taught the broad and narrow limits for the inhibitor component concentration for the compositions of this invention, however, one skilled in the art can readily determine the optimum level for each application as desired.

For efficient curing, the olefinic polydiorganosiloxane of Components (A) and (B), and the silicon-bonded hydrogen endblocked polysiloxane of Component (C), are mixed in the coating compositions of this invention in amounts that will provide a composition containing 0.8 to 1.5 silicon-bonded hydrogen radicals for every unsaturated radical in the composition.

The compositions of this invention can optionally comprise an organohydrogenpolysiloxane crosslinking agent, compatible with components (A) and (B) and the organohydrogenpolysiloxane crosslinking agent being selected from the group consisting of $(R^3_3SiO)_4Si$, $(MeHSiO)_4$, $R^3Si(OSiR^3_3)_3$, $(R^3_3SiO(Me_2SiO)_5)_4Si$, $(R^3_3SiO(MeHSiO)_7(Me_2SiO)_2)_4Si$, and an organohydrogenpolysiloxane having the general formula $ZR^3_2SiO(Me_2SiO)_x(MeR^4SiO)_y(MeHSiO)_zSiR^3_2Z$ wherein $R^3$ denotes a monovalent hydrocarbon or halohydrocarbon radical free of aliphatic unsaturation and having from 1 to 20 carbon atoms, Z denotes a hydrogen atom or an $R^3$ radical, at least 50 percent of $R^3$ being methyl, $R^4$ denotes a monovalent hydrocarbon or halohydrocarbon radical free of aliphatic unsaturation and having from 1 to 20 carbon atoms, x has an average value of 0 to 500, y has an average value of 0 to 500, and z has an average value of 3 to 100. Monovalent radicals in the organohydrogenpolysiloxane crosslinking agent include monovalent hydrocarbon and halohydrocarbon radicals free of aliphatic unsaturation as delineated above for Component (A), including preferred examples. The monovalent radicals that are present in the organohydrogenpolysiloxane crosslinking agent are preferably, but need not be, the same as the monovalent radicals that are present in Component (A). Olefinic hydrocarbon radicals in the organohydrogenpolysiloxane crosslinking agent include olefinic hydrocarbon radicals as delineated above for Component (A), including preferred examples. The olefinic hydrocarbon radicals that are present in the organohydrogenpolysiloxane crosslinking agent are preferably, but need not be, the same as the olefinic hydrocarbon radicals that are present in Component (A).

Highly preferable as the crosslinking agent for the present invention is an organohydrogensiloxane crosslinking agent having the formula $Me_3SiO(MeHSiO)_eSiMe_3$ wherein e has an average value sufficient to provide a viscosity at 25° C. of from 5 to 100 millipascal-seconds. It is preferable for the compositions of the present invention that e has an average value of from 3 to 100.

Organohydrogenpolysiloxane operates as a curing agent for the polydiorganosiloxanes of Component (A) and (B) in the coating composition and therefore must be soluble therein. It is preferable that all silicon atoms therein which bear the hydrogen radicals also bear at least one methyl radical. The organohydrogenpolysiloxane crosslinking agent may also contain silicon-bonded phenyl radicals and alkyl radicals having from 2 to 6 carbon atoms, provided that it is soluble in Component (A).

Specific examples of suitable organohydrogensiloxanes that are suitable in the compositions of this invention include $(HMe_2SiO)_4Si$, $cyclo-(MeHSiO)_y$, $(MeHSiO)_4$, $PhSi(OSiMe_2H)_3$, $(HMe_2SiO(Me_2SiO)_5)_4Si$, $(CF_3CH_2CH_2)MeHSiO\{Me(CF_3CH_2CH_2)SiO\}_ySiH-Me(CH_2CH_2CF_3)$, $Me_3SiO(MeHSiO)_ySiMe_3$, $HMe_2SiO(Me_2SiO)_{0.5y}(MeHSiO)_{0.5y}SiMe_2H$, $HMe_2SiO(Me_2SiO)_{0.5y}(MephSiO)_{0.1y}(MeHSiO)_{0.4y}SiMe_2H$, $Me_3SiO(Me_2SiO)_{0.3y}(MeHSiO)_{0.7y}SiMe_3$ and $MeSi(OSiMe_2H)_3$, $Me_3SiO(MeHSiO)_{47}SiMe_3$, $Me_3SiO(MeHSiO)_{12}SiMe_3$, and $(HMe_2SiO(MeHSiO)_7(Me_2SiO)_2)_4Si$. The value of the subscript y is not critical, however, for the coating compositions of this invention and the process of this invention, it is preferable that the organohydrogenpolysiloxane has a viscosity at 25° C. of from 5 to 100 millipascal-seconds. The exact value of y needed to provide a viscosity value within said limits depends upon the number and identity of the organic radicals. The higher molecular weight organohydrogenpolysiloxanes are preferred as the curing component for silicone release coating compositions because the higher molecular weight organohydrogenpolysiloxanes have a low volatility and will remain with and more effectively cure silicone release compositions at elevated temperatures.

Organosilicon polymers are, of course, well known in the organosilicon art. Their preparation is well documented and needs no intensive delineation herein. Organopolysiloxanes are clearly the most significant and most widely used form of organosilicon polymers in the art and in this invention; many are commercially prepared.

The compositions of the present invention can contain any optional components commonly used in platinum group metal catalyzed organosilicon compositions, colorants, stabilizers, adhesion modifiers, adhesive-release modifiers, etc. In particular, the coating compositions of this invention which have adhesive-releasing properties can further comprise the well-known high release additives of the art.

The compositions of this invention can be prepared by homogeneously mixing Components (A), (B), (C), (D), and (E), and any optional components in any order, using any suitable mixing means, such as a spatula, a drum roller, a mechanical stirrer, a three-roll mill, a sigma blade mixer, a bread dough mixer, and a two-roll mill. The order of mixing Components (A) to (E) and any optional components is not critical, however, it is highly preferred that Component (B) be brought together in the presence of Components (A) and (C), most preferably in a preliminary mixing step. It is highly preferred to admix Component (B) to (A) and/or (C), followed by adding (D), and finally (E).

The compositions of this invention have utility as formable compositions to provide organosilicon articles such as O-rings, tubing, wire-coating, gaskets, encapsulant and sealant compositions, and as coating compositions. The compositions of the present invention have particular utility as paper release coatings.

In another aspect the present invention relates to a process for preparing a laminate of a substrate and an adhesive wherein the adhesive will release from the substrate, the process comprising the steps of: (I) coating a curable silicone release composition on the surface of the substrate wherein the composition comprises: (A) a polydiorganosiloxane having the general formula $XR_2SiO(R_2SiO)_aSiR_2X$ wherein R denotes a monovalent hydrocarbon or halohydrocarbon radical free of aliphatic unsaturation and having 1 to 20 carbon atoms, X denotes an olefinic hydrocarbon radical having from 2 to 20 carbon atoms, at least 50 percent of R being methyl, and a has an average value of 1 to 1000, (B) a siloxane polymer having at least 3 silicon-bonded unsaturated organic groups per molecule and having the general formula $YR^1_2SiO(R^1_2SiO)_b(R^1YSiO)_cSiR^1_2Y$ wherein $R^1$ denotes a monovalent hydrocarbon or halohydrocarbon radical free of aliphatic unsaturation and having 1 to 20 carbon atoms, Y denotes an olefinic hydrocarbon radical having from 2 to 20 carbon atoms, at least 50 percent of $R^1$ being methyl, b has an average value of 1 to 500, and c has an average value of 1 to 100, (C) a polysiloxane having the general formula $HR^2_2SiO(R^2_2SiO)_dSiR^2_2H$ wherein $R^2$ denotes a monovalent hydrocarbon or halohydrocarbon radical free of aliphatic unsaturation and having from 1 to 20 carbon atoms, at least 50 percent of $R^2$ being methyl, and d has an average value of 1 to 1000, (D) a platinum group metal-containing catalyst, and (E) an inhibitor compound, (II) exposing the coating to an energy source selected from the group consisting of (i) heat and (ii) actinic radiation in an amount sufficient to cure the coating, and (III) applying an adhesive on the coating.

In the process of this invention the curable silicone release composition is a composition of this invention comprising Components (A), (B), (C), (D), and (E) which are delineated above, including preferred embodiments thereof. Also the composition in the process of this invention can optionally comprise an organohydrogensiloxane crosslinking agent, and a bath life extender, both of which are delineated above, including preferred embodiments thereof. The amounts of Components (A), (B), (C), (D), (E), organohydrogensiloxane crosslinker, and bath life extender that used in the curable compositions of the process of this invention are also stated above.

By actinic radiation it is meant ultraviolet light; electron beam radiation; and alpha-, beta-, gamma- and x-rays. By heat it is meant infrared radiation, hot-air, microwave radiation, etc. Of course actinic radiation is frequently accompanied by heat and the use of a combination of the two falls within the scope and spirit of the present process. In the preferred process of this invention, the coating process can be accomplished by any suitable manner known in the art, such as by spreading, brushing, extruding, spraying, off-set gravure, kiss-roll, air-knife, or by the use of multi-roll coaters.

In a preferred embodiment of the instant process the substrate is a flexible sheet material such as paper, polyolefin film and polyolefin-coated paper or-foil. Other suitable substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form the substrate can be substantially sheet-like, such as a peelable release liner for pressure sensitive adhesive; a fabric or a foil; or substantially three-dimensional in form.

After the liquid curable composition has been coated onto a substrate it may be heated and/or irradiated with actinic radiation, as noted herein, to cure the liquid coating and to adhere it to the substrate.

In a preferred embodiment of the process of this invention, a flexible sheet material, such as paper, metal foil or tapestock, is coated with a thin coating of the liquid curable composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, optionally in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based.

The compositions of this invention are also applicable to adhesive materials, other than pressure sensitive adhesives. Examples of said adhesive materials include foods, asphalt and gum polymers.

The following examples are disclosed to further teach, but not limit, the invention which is properly delineated by the appended claims. All amounts (parts and percentages) are by weight unless otherwise indicated. Viscosities were measured with a rotating spindle viscometer.

Cure time for a composition means the time interval required for the composition, when coated onto S2S kraft paper, at a thickness of 1 pound per ream, to attain the no smear, no migration, no rub-off condition (NNN).

The no smear condition was determined by lightly streaking the coating with a finger and observing for the absence of haze in the streaked area.

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper.

EXAMPLES 1-6

The following formulations were prepared and the cure time was measured at 200° F., 240° F., 300° F., and 350° F. The formulations were cured to NNN (No smear, No migration, No rub-off). Sheets were coated with a composition of the present invention, and then were aged 1 day and 1 week before they were laminated with acrylic (GMS-263; Monsanto, St. Louis, Mo.) and (SBR 36-6045; National Starch) adhesives. The laminates were also aged 1 week at room temperature before their lease values were observed. The release values were observed at 400 in./min. Also, films 2-5 mm thick were cast in aluminum dishes to examine the physical nature. Several curable coating compositions were prepared by mixing, in the order given, an amount (g=grams) of one or more of the following chain extenders A, B, or D noted in Table I and described hereinbelow; an amount (g) of an polyorganosiloxane polymer C, or E, noted in Table I and also described hereinbelow; an amount (g) of a platinum catalyst (a soluble platinum complex containing 0.67% platinum formed from chloroplatinic acid and divinyltetramethyldisiloxane), noted in Table I; and then an amount (g) of an inhibitor, bis(2-methoxyisopropyl) maleate, also noted in Table I. The cure time of the freshly prepared composition is reported in Table II below. The physical state of the composition is also described in Table II.

Chain Extender A is a hexenyl-endblocked polydimethylsiloxane having the average formula HexMe$_2$SiO(Me$_2$SiO)$_{130}$SiMe$_2$Hex wherein Me denotes methyl and Hex denotes CH$_2$=CHCH$_2$CH$_2$CH$_2$CH$_2$.

Chain Extender B is a vinyl-endblocked polydimethylsiloxane having the average formula ViMe$_2$SiO(Me$_2$SiO)$_{145}$SiMe$_2$Vi wherein Me, and Vi, denote methyl, and vinyl, respectively.

Polymer C is a hexenyl-endblocked polydimethylsiloxane copolymer having the average formula HexMe$_2$SiO(MeHexSiO)$_4$(Me$_2$SiO)$_{196}$SiMe$_2$Hex wherein Me denotes methyl and Hex denotes CH$_2$=CHCH$_2$CH$_2$CH$_2$CH$_2$—.

Chain Extender D is a silicon-bonded hydrogen endblocked polydiorganosiloxane having the average formula HMe$_2$SiO(Me$_2$SiO)$_{100}$SiMe$_2$H.

Polymer E is an organohydrogenpolysiloxane polymer having the average formula {HMe$_2$SiO(Me$_2$SiO)$_5$}$_4$Si. This polymer is specifically designed to lower crosslink density and is not the typical type of organohydrogenpolysiloxane polymer which is normally employed as a crosslinking agent.

TABLE I

| Ex. | CHAIN EXTENDER | | POLYMER | | CATALYST | INHIBITOR |
|---|---|---|---|---|---|---|
| | Ident | amt. | Ident | amt. | | |
| A | A | 23.46 | C | 23.46 | 1.83 | 1.03 |
| | D | 50.21 | | | | |
| 2 | A | 41.04 | C | 41.04 | 1.86 | 1.04 |
| | | | E | 15.02 | | |
| 3 | A | 29.96 | C | 29.96 | 1.86 | 1.07 |
| | D | 31.75 | E | 5.39 | | |
| 4 | B | 24.52 | C | 24.52 | 1.86 | 1.04 |
| | D | 48.06 | | | | |
| 5 | B | 41.56 | C | 41.56 | 1.87 | 1.04 |
| | | | E | 13.97 | | |
| 6 | A | 20.06 | C | 60.18 | 1.87 | 1.04 |
| | | | E | 16.85 | | |

TABLE II

| CURE TEM- | CURE TIME (sec.) | | | | | |
|---|---|---|---|---|---|---|
| PERATURE | Ex. 1 | 2 | 3 | 4 | 5 | 6 |
| 200° F. | 70 | 30 | 40 | 40 | 30 | 30 |
| 240° F. | 20 | 10 | 10 | 10 | 10 | 10 |
| 300° F. | 5 | <5 | <5 | <5 | <5 | <5 |
| 350° F. | 5 | <5 | <5 | <5 | <5 | <5 |
| PHYSICAL STATE | soft sticky | rubbery | soft rubbery | fluid sticky | rubbery | rubbery |

The freshly prepared compositions were coated onto 54 pound paper and samples of the coated paper were heated at 180°, 240° or 300° F. for various lengths of time and thus cured coatings were laminated, in-line, with an acrylic adhesive (GMS-263; Monsanto, St. Louis, Mo.) or with (SBR 36-6045; National Starch). The adhesive solution was applied to the coatings at a wet thickness of 3 mils using a drawdown bar. The applied adhesive was air-dried at room temperature for one minute, heated at 70° C. for one minute and the cooled to room temperature for one minute. A sheet of 60 pound matte litho was applied to the dried adhesive and the resulting laminates were pressed with a 4.5 pound rubber-coated roller. The test laminates were then aged at room temperature for 1 day and cut into 1-inch strips. Adhesive release testing was done by pulling the substrate/coating from the matte/adhesive of the 1-inch strips at an angle of 180 degrees and at a rate of 10 meters per minute. The force needed to separate the adhesive/coating interface was noted several times during the separation and adhesive release was noted as an average of the several readings.

The data described in Table III hereinbelow, show that the compositions of this invention provide higher release values in an in-line process of adhesive lamination than those of the prior art. The compositions of the present invention produced release values ranging from 50 to 175 g/in against an acrylic adhesive. In comparison, compositions containing a vinyl or hexenyl endblocked polydimethylsiloxane alone produced release values of from 50 to 85 g/in against the acrylic adhesive. The hard brittle films gave very low release values, and as the films became softer and more elastic the release values increased. Thus release forces with stable release both in terms of coated paper aging and of laminate aging have been achieved. When the laminate was measured for release it was aged for 7 days and the coating that was used to prepare the laminate had been aged for 1 day at room temperature.

TABLE III

ADHESIVE RELEASE FORCE OF COATINGS AND LAMINATES

| ADHESIVE | COATING AGE | ADHESIVE RELEASE (g/in) | | | | | |
|---|---|---|---|---|---|---|---|
| | | EX. 1 | 2 | 3 | 4 | 5 | 6 |
| ACRYLIC | 1 DAY | 127 | 75 | 110 | 140 | 80 | 60 |
| SBR | 1 DAY | 65 | 50 | 60 | 60 | 54 | 50 |
| ACRYLIC | 7 DAY | 130 | 68 | 90 | 140 | 80 | 60 |
| SBR | 7 DAY | 50 | 55 | 60 | 60 | 50 | 55 |
| ACRYLIC LAMINATE | 1 DAY | 175 | 75 | 110 | 150 | 85 | 75 |
| SBR LAMINATE | 1 DAY | 65 | 50 | 80 | 100 | 80 | 65 |

EXAMPLES 7-12

The following formulations were prepared and the cure time was measured at 250° F., 300° F., and 350° F. The formulations were cured to no migration. The sheets were coated with a composition of the present invention, and then were aged 1 day before they were laminated with acrylic (GMS-263; Monsanto, St. Louis, Mo.) and (SBR 36-6045; National Starch) adhesives. The laminates were also aged 1 day at room temperature before the release values were observed. The release values were observed at 400 in./min.. Also, films 2-5 mm thick were cast in aluminum dishes to examine the physical nature. The SiH to SiVi ratios for the compositions in Examples 7-13 were all one to one (i.e. one silicon bonded hydrogen radical exists for every silicon bonded vinyl radical).

Several curable coating compositions were prepared by mixing, in the order given, an amount (g=grams) of polymer A, or C, noted in Table IV and described hereinbelow; an amount (g) of an chain extender B, D, or E, noted in Table IV and also described hereinbelow; an amount (g) of a platinum catalyst (a soluble platinum complex containing 0.67% platinum formed from chloroplatinic acid and divinyltetramethyldisiloxane), noted in Table IV; and then an amount (g) of an inhibitor, bis(2-methoxyisopropyl) maleate, also noted in Table IV. The cure time of the freshly prepared composition is reported in Table V below. The physical state of the composition is also described in Table V.

Polymer A is a hexenyl-endblocked polydimethylsiloxane copolymer having the average formula $HexMe_2SiO(MeHexSiO)_2(Me_2SiO)_{198}SiMe_2Hex$ wherein Me denotes methyl and Hex denotes $CH_2=CHCH_2CH_2CH_2CH_2-$.

Chain Extender B is a vinyl-endblocked polydimethylsiloxane having the average formula $ViMe_2SiO(Me_2SiO)_{145}SiMe_2Vi$ wherein Me, Vi, and Ph denote methyl, vinyl, and phenyl, respectively.

Polymer C is an organohydrogenpolysiloxane polymer having the average formula $\{HMe_2SiO(MeHSiO)_7(Me_2SiO)_2\}_4Si$.

Chain Extender D is a silicon-bonded hydrogen endblocked polydiorganosiloxane having the average formula $HMe_2SiO(Me_2SiO)_{100}SiMe_2H$.

Chain Extender E is a silicon-bonded hydrogen endblocked polydiorganosiloxane having the average formula $HMe_2SiO(Me_2SiO)_{400}SiMe_2H$.

TABLE IV

| | CHAIN EXTENDER | | POLYMER | | | |
|---|---|---|---|---|---|---|
| Ex. | Ident | amt. | Ident | amt. | CATALYST | INHIBITOR |
| 7 | B | 41.46 | A | 53.61 | 1.86 | 1.04 |
| | | | C | 2.04 | | |
| 8 | B | 21.41 | A | 27.69 | 1.87 | 1.04 |
| | D | 47.99 | | | | |
| 9 | B | 66.70 | A | 28.75 | 1.87 | 1.04 |
| | | | C | 1.64 | | |
| 10 | B | 38.05 | A | 16.40 | 1.87 | 1.04 |
| | D | 42.64 | | | | |
| 11 | B | 16.49 | A | 7.11 | 1.86 | 1.04 |
| | E | 73.50 | | | | |
| 12 | B | 26.47 | A | 11.41 | 1.87 | 1.04 |
| | E | 58.88 | C | 0.326 | | |

TABLE V

| CURE TEM- | CURE TIME (sec.) | | | | | |
|---|---|---|---|---|---|---|
| PERATURE | Ex. 7 | 8 | 9 | 10 | 11 | 12 |
| 250° F. | 10 | — | 10 | — | — | — |
| 300° F. | 5 | 10 | 5 | 10 | — | 30 |
| 350° F. | <5 | <5 | — | 5 | — | 30 |
| PHYSICAL STATE | rubbery | soft sticky | rubbery | soft sticky | fluid | fluid |

The adhesive release forces were determined for the compositions according to the procedures described in Examples 1-6 hereinabove.

The data described in Table VI hereinbelow, show that the compositions of this invention provide higher release values in an in-line process of adhesive lamination than those of the prior art. The compositions of the present invention produced release values ranging from 63 to 155 g/in against an acrylic adhesive. In comparison, compositions containing a vinyl or hexenyl endblocked polydimethylsiloxane alone (i.e. those samples without a silicon-bonded hydrogen endblocked polydiorganosiloxane chain extender) produced release values of from 30 to 45 g/in against the acrylic adhesive. The hard brittle films gave very low release values, and as the films became softer and more elastic the release values increased. Thus release forces with stable release both in terms of coated paper aging and of laminate aging have been achieved. When the laminate was measured for release, the coating had been aged for 1 day at room temperature.

TABLE VI

ADHESIVE RELEASE FORCE OF LAMINATES

| | | | ADHESIVE RELEASE (g/in) | | | | |
|---|---|---|---|---|---|---|---|
| | AD- | | EX. | | | | |
| TEMP. | HESIVE | AGE | 7 | 8 | 9 | 10 | 11 | 12 |
| 300° F. | ACRYLIC | 1 DAY | 33 | 148 | 40 | 155 | — | 90 |
| 350° F. | ACRYLIC | 1 DAY | 30 | 150 | 33 | 145 | — | 110 |
| 300° F. | SBR | 1 DAY | 45 | 68 | 36 | 75 | — | 63 |
| 350° F. | SBR | 1 DAY | 40 | 65 | 40 | 73 | — | 63 |

EXAMPLES 13-20

The following formulations were prepared, coated on S2S S.K. Kraft paper. The formulations were cured to no migration. The sheets were coated with a composition of the present invention, and then were aged 24 hours before they were laminated with an acrylic adhesive. The release values were observed at 400 in./min..

Several curable coating compositions were prepared by mixing, in the order given, an amount (g=grams) of polymer A, noted in Table VII and described hereinbelow; an amount (g) of polydiorganosiloxane chain extender B, C, D, or E, noted in Table VII and also described hereinbelow; an amount (g) of a platinum catalyst (a soluble platinum complex containing 0.67% platinum formed from chloroplatinic acid and divinyltetramethyldisiloxane), noted in Table VII; and then an amount (g) of an inhibitor, bis(2-methoxyisopropyl) maleate, also noted in Table VII.

Polymer A is a hexenyl-endblocked polydimethylsiloxane copolymer having the average formula HexMe$_2$SiO(MeHexSiO)$_3$(Me$_2$SiO)$_{145}$SiMe$_2$Hex wherein Me denotes methyl and Hex denotes CH$_2$=CHCH$_2$CH$_2$CH$_2$CH$_2$—.

Chain Extender B is a vinyl-endblocked polydimethylsiloxane having the average formula ViMe$_2$SiO(Me$_2$SiO)$_{299}$SiMe$_2$Vi wherein Me, and Vi, denote methyl, and vinyl, respectively.

Chain Extender C is a hexenyl-endblocked polydimethylsiloxane having the average formula HexMe$_2$SiO(Me$_2$SiO)$_{198}$SiMe$_2$Hex wherein Me denotes methyl and Hex denotes CH$_2$=CHCH$_2$CH$_2$CH$_2$CH$_2$—.

Chain Extender D is a hexenyl-endblocked polydimethylsiloxane having the average formula HexMe$_2$SiO(Me$_2$SiO)$_{300}$SiMe$_2$Hex wherein Me denotes methyl and Hex denotes CH$_2$=CHCH$_2$CH$_2$CH$_2$CH$_2$—.

Chain Extender E is an silicon-bonded hydrogen endblocked polydiorganosiloxane having the average formula HMe$_2$SiO(Me$_2$SiO)$_{100}$SiMe$_2$H.

TABLE VII

| | | CHAIN EX-TENDER | | | |
|---|---|---|---|---|---|
| EX. | POLYMER A | Ident | amt. | CATALYST | INHIBITOR |
| 13 | 36.50 | C | 12.10 | 1.95 | 1.10 |
| | | E | 51.90 | | |
| 14 | 31.50 | C | 10.50 | 1.95 | 1.10 |
| | | E | 58.00 | | |
| 15 | 36.40 | B | 12.10 | 1.95 | 1.10 |
| | | E | 51.50 | | |
| 16 | 31.50 | B | 10.50 | 1.95 | 1.10 |
| | | E | 58.00 | | |
| 17 | 36.50 | C | 12.10 | 1.95 | 0.83 |
| | | E | 51.90 | | |
| 18 | 36.50 | C | 12.10 | 1.95 | 0.55 |
| | | E | 51.90 | | |
| 19 | 36.50 | C | 12.10 | 1.95 | 0.28 |
| | | E | 51.90 | | |
| 20 | 36.90 | D | 12.30 | 1.95 | 1.10 |
| | | E | 50.20 | | |

The adhesive release forces were determined for the compositions according to the procedures described in Examples 1-6 hereinabove except that the samples of the coated paper were heated at 200° C., 250° C., 300° C., and 350° C. for various lengths of time prior to the cured coatings being laminated. Also the cured coatings were laminated with an acrylic adhesive (GMS-263; Monsanto, St. Louis, Mo.).

The data described in Table VIII, show that the compositions of this invention consistently provided higher release values in an in-line process of adhesive lamination than did the compositions without the above described chain extenders. The compositions of the present invention produced release values ranging from 110 to 150 g/in against an acrylic adhesive and had a stable release profile. The hard brittle films gave very low release values, and as the films became softer and more elastic the release values increased. Thus release forces with stable release both in terms of coated paper aging and of laminate aging have been achieved. When the laminate was measured for release, the coating had been aged for 1 day at room temperature.

TABLE VIII

ADHESIVE RELEASE FORCE OF LAMINATES

ADHESIVE RELEASE (g/in at 400 in/min)

| TEMP. | EX. 13 | 14 | 15 | 16 | 17 | 18 | 19 | 20 |
|---|---|---|---|---|---|---|---|---|
| 200° F. | 150 | 128 | 128 | 120 | 150 | 120 | 110 | 138 |
| 250° F. | 140 | 120 | 120 | 133 | 150 | 120 | 110 | 150 |
| 300° F. | 130 | 120 | 115 | 115 | 140 | 130 | 110 | 145 |
| 350° F. | 150 | 140 | 140 | 140 | 140 | 125 | 110 | 145 |

EXAMPLES 21-22

The following formulations were prepared, coated on Nicolet paper. The formulations were cured to no migration at 200° F. and 400° F. The sheets were coated with a composition of the present invention, and then were aged 24 hours before they were laminated with an acrylic adhesive. The laminates were then aged for 7 days. The release values were observed at various speeds. The coatings were also cured with various times at 200° F. and immediately laminated. The release values were then observed 1 day later.

Several curable coating compositions were prepared by mixing, in the order given, an amount (g=grams) of polymer A, noted in Table IX and described hereinbelow; an amount (g) of polydiorganosiloxane chain extender B, or C, noted in Table IX and also described hereinbelow (added only in Example 22); an amount (g) of a platinum catalyst (a soluble platinum complex containing 0.67% platinum formed from chloroplatinic acid and divinyltetramethyldisiloxane), noted in Table IX; an amount (g) of an inhibitor, bis(2-methoxyisopropyl) maleate, also noted in Table IX; and an amount (g) of an organohydrogenpolysiloxane polymer D (added only in Example 21).

Polymer A is a hexenyl-endblocked polydimethylsiloxane copolymer having the average formula $HexMe_2SiO(MeHexSiO)_3(Me_2SiO)_{145}SiMe_2Hex$ wherein Me denotes methyl and Hex denotes $CH_2=CHCH_2CH_2CH_2CH_2-$.

Chain Extender B is an silicon-bonded hydrogen endblocked polydiorganosiloxane having the average formula $HMe_2SiO(Me_2SiO)_{100}SiMe_2H$.

Chain Extender C is a hexenyl-endblocked polydimethylsiloxane having the average formula $HexMe_2SiO(Me_2SiO)_{198}SiMe_2Hex$ wherein Me denotes methyl and Hex denotes $CH_2=CHCH_2CH_2CH_2CH_2-$.

Polymer D is an organohydrogenpolysiloxane polymer having the average formula $Me_3SiO(MeHSiO)_{13}SiMe_3$.

The freshly prepared compositions were coated onto 54 pound paper and samples of the coated paper were heated at 200° F., 250° F., 300° F., and 350° F. for various lengths of time and then aged for 1 day. The thus cured coatings were laminated, in-line, with an acrylic adhesive (GMS-263; Monsanto, St. Louis, Mo.). The adhesive solution was applied to the coatings at a wet thickness of 3 mils using a drawdown bar. The applied adhesive was air-dried at room temperature for one minute, heated at 70° C. for one minute and the cooled to room temperature for one minute. A sheet of 60 pound matte litho was applied to the dried adhesive and the resulting laminates were pressed with a 4.5 pound rubber-coated roller. The test laminates were then aged at room temperature for 7 days and cut into 1-inch strips. A second test was also run wherein the cured coatings were laminated immediately after curing and these laminates were then aged at room temperature for 1 day. Adhesive release testing was done by pulling the substrate/coating from the matte/adhesive of the 1-inch strips at an angle of 180 degrees and at a rate of 10 meters per minute. The force needed to separate the adhesive/coating interface was noted several times during the separation and adhesive release was noted as an average of the several readings.

The release values, listed in Tables X and XI, show that the compositions of this invention consistently provided high release values in an in-line process of adhesive lamination. The compositions of the present invention produced release values ranging from two to three times greater than compositions without chain extenders against an acrylic adhesive. The hard brittle films gave very low release values, and as the films became softer and more elastic the release values increased. Thus release forces with stable release both in terms of coated paper aging and of laminate aging have been achieved.

TABLE X

ADHESIVE RELEASE FORCE OF LAMINATES
(g/in) (Aged 7 days)

| | | EX. 21 | | EX. 22 | |
|---|---|---|---|---|---|
| RELEASE SPEED | CURE TEMP CURE TIME | 200° F. 70 sec. | 400° F. 5 sec. | 200° F. 70 sec. | 400° F. 5 sec. |
| 12 in/min | | 75 | 18 | 120 | 55 |
| 10 M/min | | 104 | 19 | 83 | 54 |
| 40 M/min | | 92 | 30 | 97 | 68 |
| 70 M/min | | 70 | 23 | 80 | 54 |
| 100 M/min | | 84 | 25 | 91 | 59 |
| 200 M/min | | 73 | 25 | 83 | 62 |
| 300 M/min | | 66 | 26 | 94 | 60 |

TABLE XI

ADHESIVE RELEASE FORCE OF LAMINATES
(g/in) (at 400 in./min.)

| EX. | CURE TIME (SEC) | 20 | 70 | 80 | 130 | 140 | 190 | 200 | 250 |
|---|---|---|---|---|---|---|---|---|---|
| 21 | | TORE | | 75 | | 60 | | 50 | |
| 22 | | | 165 | | 150 | | 140 | | 140 |

TABLE IX

| | | CHAIN EXTENDER | | | | |
|---|---|---|---|---|---|---|
| EX. | POLYMER A | Ident | amt | CATALYST | INHIBITOR | POLYMER D |
| 21 | 100.00 | — | — | 1.95 | 1.10 | 3.50 |
| 22 | 36.50 | B | 51.90 | 1.95 | 0.83 | — |
| | | C | 12.10 | | | |

EXAMPLES 23-24

The following formulations were prepared, and coated on 37 pound Nicolet paper. The formulations were cured to no migration at 200° F., 250° F., 300° F., 350° F., and 400° F. The sheets were coated with a composition of the present invention, and then were aged various amounts of time before they were laminated with an acrylic adhesive. The laminates were then aged. The release values were observed at 400 in./min..

Several curable coating compositions were prepared by mixing, in the order given, an amount (g=grams) of coating A, or polymer B noted in Table XII and described hereinbelow; an amount (g) of polydiorganosiloxane chain extender C, or D, noted in Table XII and also described hereinbelow; an amount (g) of a platinum catalyst (a soluble platinum complex containing 0.67% platinum formed from chloroplatinic acid and divinyltetramethyldisiloxane), noted in Table XII; an amount (g) of an inhibitor, bis(2-methoxyisopropyl) maleate, also noted in Table XII; and an amount (g) of an organohydrogenpolysiloxane polymer (added only in Example 23).

Coating A is a mixture of about 97.29 weight percent of hexenyl-endblocked polydimethylsiloxane copolymer having the average formula HexMe$_2$SiO(MeHexSiO)$_3$(Me$_2$SiO)$_{145}$SiMe$_2$Hex wherein Me denotes methyl and Hex denotes CH$_2$=CHCH$_2$CH$_2$CH$_2$CH$_2$—, about 1.90 weight percent of a platinum catalyst (a soluble platinum complex containing 0.67% platinum formed from chloroplatinic acid and divinyltetramethyldisiloxane), and about 0.81 weight percent of an inhibitor, bis(2-methoxyisopropyl) maleate.

Polymer B is a hexenyl-endblocked polydimethylsiloxane copolymer having the average formula HexMe$_2$SiO(MeHexSiO)$_3$(Me$_2$SiO)$_{145}$SiMe$_2$Hex wherein Me denotes methyl and Hex denotes CH$_2$=CHCH$_2$CH$_2$CH$_2$CH$_2$—.

Chain Extender C is an silicon-bonded hydrogen endblocked polydiorganosiloxane having the average formula HMe$_2$SiO(Me$_2$SiO)$_{100}$SiMe$_2$H.

Chain Extender D is a hexenyl-endblocked polydimethylsiloxane having the average formula HexMe$_2$SiO(Me$_2$SiO)$_{198}$SiMe$_2$Hex wherein Me denotes methyl and Hex denotes CH$_2$=CHCH$_2$CH$_2$CH$_2$CH$_2$—.

Polymer E is an organohydrogenpolysiloxane polymer having the average formula Me$_3$SiO(MeHSiO)$_{1.3}$SiMe$_3$.

The compositions of the present invention produced release values ranging from two to three times greater than compositions without chain extenders against an acrylic adhesive. The hard brittle films gave very low release values, and as the films become softer and more elastic the release values increased. Thus release forces with stable release both in terms of coated paper aging and of laminate aging have been achieved. In Table XIII hereinbelow, Column 1 was laminated immediately and aged 1 day before testing release, Column 2 was laminated after 1 day and aged 1 day before testing release, Column 3 was laminated after 7 days and aged 1 day before testing release, Column 4 was laminated immediately and aged 7 days before testing release, Column 5 was laminated after 1 day and aged 7 days before testing release, and Column 6 was laminated after 7 days and aged 7 days before testing release.

TABLE XIII

| CURE TIME/ CURE TEMP | ADHESIVE RELEASE OF LAMINATES (g/in) | | | | | | | | | | | |
|---|---|---|---|---|---|---|---|---|---|---|---|---|
| | 1 | | 2 | | 3 | | 4 | | 5 | | 6 | |
| | 23 | 24 | 23 | 24 | 23 | 24 | 23 | 24 | 23 | 24 | 23 | 24 |
| 20/200° F. | TORE | | 50 | | 110 | | TORE | | 75 | 135 | 30 | 110 |
| 70/200° F. | | 150 | | 110 | | 100 | | 150 | | | | |
| 5/250° F. | TORE | | 45 | | 200 | | 300 | | 80 | 125 | 30 | 110 |
| 15/250° F. | | 125 | | 110 | | 85 | | 150 | | | | |
| 5/300° F | 75 | | 35 | | 110 | | 65 | | 45 | | 30 | 110 |
| 10/300° F. | | 125 | | 80 | | 76 | | 140 | | 90 | | |
| 5/350° F. | 50 | 125 | 30 | 80 | 70 | 73 | 50 | 125 | 35 | 90 | 25 | 115 |
| 5/400° F. | 50 | 110 | 30 | 80 | 50 | 70 | 40 | 138 | 35 | 90 | 30 | 110 |

EXAMPLES 25-32

Several curable coating compositions were prepared by mixing, an amount of: a chain extender A, B, or C noted in Table XIV and described hereinbelow, in 100 parts of Coating D described hereinbelow; and adding an amount of an organohydrogenpolysiloxane crosslinker E, noted in Table XIV and also described herein-

TABLE XII

| EX. | COATING A/ POLYMER B | | CHAIN EXTENDER | | CATALYST | INHIBITOR | POLYMER E |
|---|---|---|---|---|---|---|---|
| | | | Indent | amt | | | |
| 23 | A | 100.00 | — | — | — | — | 3.50 |
| 24 | B | 36.50 | C | 51.90 | 1.95 | 0.83 | — |
| | | | D | 12.10 | | | |

The thus cured coatings were laminated, in-line, with an acrylic adhesive (GMS-263; Monsanto, St. Louis, Mo.). The adhesive solution was applied to the coatings at a wet thickness of 3 mils using a drawdown bar. The applied adhesive was air-dried at room temperature for one minute, heated at 70° C. for one minute and the cooled to room temperature for one minute. A sheet of 60 pound matte litho was applied to the dried adhesive and the resulting laminates were pressed with a 4.5 pound rubber-coated roller. The test laminates were then aged for various amounts of time and cut into 1-inch strips.

Adhesive release testing was done by pulling the substrate/coating from the matte/adhesive of the 1-inch strips at an angle of 180 degrees and at a rate of 10 meters per minute. The force needed to separate the adhesive/coating interface was noted several times during the separation and adhesive release was noted as an average of the several readings.

The release values, listed in Table XIII, show that the compositions of this invention provided consistently high release values while maintaining stable release profiles in the in-line process of adhesive lamination.

below. The coating compositions prepared by first mixing the chain extender (A, or B) to coating D in parts by weight, stirring until uniform, adding chain extender C and then adding organohydrogenpolysiloxane crosslinker E. The cure time of the freshly prepared composition is reported in Table XV below (1'=1 min.. 45"=45 sec.). The SiH to Vinyl ratio in each of the curable compositions is reported in Table XIV.

These formulations were then coated onto James River S2S super calendared kraft paper. The coatings thus applied were cured three times as long as the no smear, no rub-off, no migration (NNN) time indicated in the Tables displayed hereinbelow at 82° C. in a forced air oven. Then these were coated with National Starch 36-6045 or 36-6149 (SBR 36-6045; National Starch) adhesives using a 3 mil Bird bar. The adhesive was cured 1 minute at 100° C. in an oven. Next the above sheets were laminated with 60 lb. Matte Litho label stock and rolled twice with a 5 pound roller. The laminates were aged by storing them for a day at 70° C.

One inch strips were cut from the laminates and tested for release force by pulling the liner from the label at 180° using a Finat High Speed Release tester at 1, 10, 100, and 300 meters per minute (M/min). The results are shown as the average of two tests from the same laminate.

Chain Extender A is a vinyl-endblocked polydimethylsiloxane having the average formula ViMe$_2$SiO(Me$_2$SiO)$_{800}$SiMe$_2$Vi wherein Me denotes methyl and Vi denotes vinyl.

Chain Extender B is a vinyl-endblocked polydimethylsiloxane having the average formula ViMe$_2$SiO(Me$_2$SiO)$_{300}$SiMe$_2$Vi wherein Me denotes methyl and Vi denotes vinyl.

Chain Extender C is an silicon-bonded hydrogen-endblocked polydimethylsiloxane having the average formula HMe$_2$SiO(Me$_2$SiO)$_{15}$SiMe$_2$H wherein Me denotes methyl.

Coating D is a blend of 97 parts by weight of vinyl-endblocked polydimethyl-co-methylvinylsiloxane having the average formula ViMe$_2$SiO(Me$_2$SiO)$_{96}$(MeViSiO)$_2$SiMe$_2$Vi wherein Me denotes methyl and Vi denotes vinyl, 2 parts of a platinum catalyst (a soluble platinum complex containing 0.67% platinum formed from chloroplatinic acid and divinyltetramethyldisiloxane), and 1 part of bis(2-methoxyisopropyl) maleate inhibitor, all parts being based on the total weight of the blend.

Crosslinker E is an organohydrogenpolysiloxane crosslinker having the average formula Me$_3$SiO(MeHSiO)$_{13}$SiMe$_3$.

TABLE XIV

COMPOSITIONS OF EXAMPLES 25-32
PARTS PER 100 PARTS OF COATING D

| Ex. | CHAIN EXTENDER A | B | C | COATING D | CROSSLINKER E | SiH/Vi ratio |
|---|---|---|---|---|---|---|
| 25 | — | — | — | 100 | 3.25 | 1.1 |
| 26 | — | — | 20 | 100 | 0.985 | 1.1 |
| 27 | 25 | — | — | 100 | 3.31 | 1.1 |
| 28 | — | 25 | — | 100 | 3.43 | 1.1 |
| 29 | 25 | — | 20 | 100 | 1.05 | 1.1 |
| 30 | 13.1 | — | 16.9 | 100 | 1.34 | 1.0 |
| 31 | 73 | — | 23.5 | 100 | 0.65 | 0.9 |
| 32 | — | 25 | 20 | 100 | 1.17 | 1.1 |

TABLE XV

ADHESIVE RELEASE FORCE

| EXAMPLE | CURE TIME NNN @ 82° C. | RELEASE FORCE (g) SBR ADHESIVE | | | |
|---|---|---|---|---|---|
| | | 1 | 10 | 100 | 300 M/min |
| 25 | 1'10" | 9.9 | 13.5 | 23.8 | 31.2 |
| 26 | 1'40" | 10.0 | 17.0 | 35.3 | 43.7 |
| 27 | <3' | 9.6 | 14.2 | 41.0 | 57.6 |
| 28 | 1'30" | 9.1 | 13.2 | 32.5 | 40.5 |
| 29 | 2' | 12.4 | 20.3 | 59.2 | 72.7 |
| 30 | 1'45" | 12.9 | 20.1 | 38.3 | 42.2 |
| 31 | 3' | 9.9 | 18.0 | 53.9 | 70.5 |
| 32 | 1'45" | 11.3 | 17.5 | 43.6 | 56.1 |

Table XV shows the results of mixing a vinyl-endblocked chain extender and silicon-bonded hydrogen endblocked chain extender with a crosslinker in a coating formulation. The release forces at 10 M/min. and above are much higher and the cure time is shortened for the compositions of the present invention. None of the references of the art disclose the unexpected result produced by the compositions of this invention.

EXAMPLES 33-39

Again several curable coating compositions were prepared this time by mixing, in the order given, an amount (g) of: a chain extender A, or B, noted in Table XVI and described hereinbelow; an amount of a high release additive F, noted in Table XVI and described hereinbelow; 100 parts of coating D described hereinbelow; an amount of chain extender C noted in Table XVI and described hereinbelow; and an amount of an organohydrogenpolysiloxane crosslinker E, noted in Table XVI and also described hereinbelow. The coating compositions were prepared by first mixing the vinyl-ended chain extender (A or B) and the high release additive (F) to coating D in parts by weight, stirring until uniform and then adding the SiH-ended chain extender C and then adding organohydrogenpolysiloxane crosslinker E. The cure time of the freshly prepared composition is reported in Table XVII below (1'=1 min. 45"=45 sec.). The SiH to Vinyl ratio in each of the curable compositions is also reported in Table XVI.

These formulations were then coated onto James River S2S super calendared kraft paper. The coatings thus applied were cured three times as long as the no smear, no rub-off, no migration (NNN) time indicated in the Tables displayed hereinbelow at 82° C. in a forced air oven. Then these were coated with (SBR 36-6045 or 36-6149; National Starch) adhesives using a 3 mil Bird bar. The adhesive was cured 1 minute at 100° C. in an oven. Next the above sheets were laminated with 60 lb. Matte Litho label stock and rolled twice with a 5 pound roller. The laminates were aged by storing them for a day at 70° C.

One inch strips were cut from the laminates and tested for release force by pulling the liner from the label at 180° using a Finat High Speed Release tester at 1, 10, 100, and 300 meters per minute (M/min). The results are shown as the average of two tests from the same laminate.

Chain Extender A is a vinyl-endblocked polydimethylsiloxane having the average formula ViMe$_2$SiO(Me$_2$SiO)$_{800}$SiMe$_2$Vi wherein Me denotes methyl and Vi denotes vinyl.

Chain Extender B is 98 parts of a vinyl-endblocked polydimethylsiloxane having the average formula ViMe$_2$SiO(Me$_2$SiO)$_{800}$SiMe$_2$Vi wherein Me denotes methyl and Vi denotes vinyl, and about 2 parts of a platinum catalyst (a soluble platinum complex containing 0.67% platinum formed from chloroplatinic acid and divinyltetramethyldisiloxane), all parts being based on the total weight of the blend.

Chain Extender C is a silicon-bonded hydrogen-endblocked polydimethylsiloxane having the average formula HMe$_2$SiO(Me$_2$SiO)$_{15}$SiMe$_2$H and a viscosity of about 11 Cs(Centistokes) wherein Me denotes methyl.

Coating D is a blend of 97 parts by weight of vinyl-endblocked polydimethyl-co-methylvinylsiloxane having the average formula ViMe$_2$SiO(Me$_2$SiO)$_{96}$(MeViSiO)$_2$SiMe$_2$Vi wherein Me denotes methyl and Vi denotes vinyl, 2 parts of a platinum catalyst (a soluble platinum complex containing 0.67% platinum formed from chloroplatinic acid and divinyltetramethyldisiloxane), and 1 part of bis(2-methoxyisopropyl) maleate inhibitor, all parts being based on the total weight of the blend.

Crosslinker E is an organohydrogenpolysiloxane crosslinker having the average formula $Me_3SiO(MeHSiO)_{47}SiMe_3$.

High Release Additive (HRA) F is a blend of about 97 parts of a compound comprising 46 percent by weight of a vinyl capped silicone resin dispersed in 54 percent by weight of a vinyl functional polymer, the compound having a viscosity of 8500 cP, 2 parts of a platinum catalyst (a soluble platinum complex containing 0.67% platinum formed from chloroplatinic acid and divinyltetramethyldisiloxane), and 1 part of bis(2-methoxyisopropyl) maleate inhibitor, all parts being based on the total weight of the blend.

TABLE XVI

COMPOSITIONS OF EXAMPLES 33-39
PARTS PER 100 PARTS OF COATING D

| Ex. | CHAIN EXTENDER A | B | C | COATING D | CROSS-LINKER E | HRA F | SiH/Vi ratio |
|---|---|---|---|---|---|---|---|
| 33 | — | — | — | 100 | 3.63 | 20 | 1.1 |
| 34 | — | — | 20 | 100 | 1.79 | 25 | 1.1 |
| 35 | 12.5 | — | 20 | 100 | 1.64 | 20 | 1.1 |
| 36 | — | — | — | 100 | 2.91 | — | 1.1 |
| 37 | — | — | — | 100 | 3.81 | 25 | 1.1 |
| 38 | — | 15 | 20 | 100 | 1.67 | 25 | 1.1 |
| 39 | — | 15 | 30 | 100 | 0.58 | 25 | 1.1 |

TABLE XVII

ADHESIVE RELEASE FORCE

| EXAMPLE | CURE TIME NNN @ 82° C. | RELEASE FORCE (g) SBR ADHESIVE | | | |
|---|---|---|---|---|---|
| | | 1 | 10 | 100 | 300 M/min |
| 33 | 3' | 18.8 | 26.8 | 42.9 | 44.6 |
| 34 | 1'50" | 11.2 | 22.5 | 30.7 | 33.2 |
| 35 | 3' | 17.0 | 36.2 | 65.8 | 66.7 |
| 36 | 2'20" | 8.7 | 13.8 | 24.5 | 28.1 |
| 37 | 2' | 17.7 | 28.4 | 29.6 | 28.6 |
| 38 | 2'45" | 20.8 | 39.4 | 68.9 | 57.6 |
| 39 | — | 17.3 | 40.6 | 73.0 | 63.8 |

Table XVII shows that in release coatings of Coating D containing 20 parts of the high release additive (HRA F) and crosslinked with Crosslinker E the combination of silicon-bonded hydrogen endblocked chain extender C and vinyl endblocked chain extender A increases the release force at release speeds of 10 M/min. or higher and has an acceptable cure time in contrast to compositions having only the Coating D, Crosslinker E, and HRA F, or even those compositions which have D, E, and F cited hereinabove and an silicon-bonded hydrogen-endblocked chain extender.

In addition Table XVII shows that a combination of a vinyl endblocked chain extender B and a silicon-bonded hydrogen endblocked chain extender C significantly increased the release force at 10 M/min. and higher release speeds when used with Coating D and HRA F. Those compositions containing only Coating D, Crosslinker E, or compositions containing D, E, and HRA F also do not provide the advantageous release speeds as compared to the compositions of the present invention. Table XVII further shows that the compositions of the present invention while providing a high release force at elevated delamination speeds also maintain an acceptable cure time.

EXAMPLES 40-42

The procedure employed in Examples 33-39 was repeated except that two different silicon-bonded hydrogen-ended chain extenders (C1 and C2) were compared to the silicon-bonded hydrogen-endblocked chain extender C tested in Examples 33-39 and described hereinabove. Also the crosslinker utilized is the same crosslinker that was employed in Examples 25-32. The Crosslinker used and the three different SiH endblocked polymers are described below. All other components are the same as those described in Examples 33-39.

Chain Extender C is a silicon-bonded hydrogen-endblocked polydimethylsiloxane having the average formula $HMe_2SiO(Me_2SiO)_{15}SiMe_2H$.

Chain Extender C1 is a silicon-bonded hydrogen-endblocked polydimethylsiloxane having the average formula $HMe_2SiO(Me_2SiO)_{50}SiMe_2H$.

Chain Extender C2 is a silicon-bonded hydrogen-endblocked polydimethylsiloxane having the average formula $HMe_2SiO(Me_2SiO)_{150}SiMe_2H$.

Crosslinker E is an organohydrogenpolysiloxane crosslinker having the average formula $Me_3SiO(MeHSiO)_{13}SiMe_3$.

TABLE XVIII

COMPOSITIONS OF EXAMPLES 40-42
PARTS PER 100 PARTS OF COATING D

| Ex. | CHAIN EXTENDER B | C | C1 | C2 | COATING D | CROSSLINKER E | HRA F | SiH/Vi ratio |
|---|---|---|---|---|---|---|---|---|
| 40 | 15 | 20 | — | — | 100 | 1.86 | 25 | 1.1 |
| 41 | 15 | — | 20 | — | 100 | 3.36 | 25 | 1.1 |
| 42 | 15 | — | — | 20 | 100 | 3.98 | 25 | 1.1 |

TABLE XIX

ADHESIVE RELEASE FORCE

| EXAMPLE | CURE TIME NNN @ 82° C. | RELEASE FORCE (g) SBR ADHESIVE | | | |
|---|---|---|---|---|---|
| | | 1 | 10 | 100 | 300 M/min |
| 40 | 2' | 19.1 | 35.3 | 59.2 | 57.9 |
| 41 | 2'30" | 19.9 | 34.8 | 57.9 | 54.8 |
| 42 | 3'20" | 18.3 | 30.9 | 57.7 | 57.5 |

Table XIX shows that higher molecular weight silicon-bonded hydrogen-endblocked polydiorganosiloxanes (chain extender C1 has a Dp of 50 and chain extender C2 has a Dp of 150), also provide higher release values at high delamination speeds.

That which is claimed is:

1. A curable coating composition comprising:
(A) a polydiorganosiloxane having the general formula:

$XR_2SiO(R_2SiO)_aSiR_2X$ wherein R denotes a monovalent hydrocarbon or halohydrocarbon radical free of aliphatic unsaturation and having 1 to 20 carbon atoms, X denotes an olefinic hydrocarbon radical having from 2 to 20 carbon atoms, at least 50 percent of R being methyl, and a has an average value of 1 to 1000;

(B) a siloxane polymer having at least 3 silicon-bonded unsaturated organic groups per molecule and having the general formula:

$$YR^1{}_2SiO(R^1{}_2SiO)_b(R^1YSiO)_cSiR^1{}_2Y$$

wherein $R^1$ denotes a monovalent hydrocarbon or halohydrocarbon radical free of aliphatic unsaturation and having 1 to 20 carbon atoms, Y denotes an olefinic hydrocarbon radical having from 2 to 20 carbon atoms, at least 50 percent of $R^1$ being methyl, b has an average value of 1 to 500, and c has an average value of 1 to 100;

(C) a polysiloxane having the general formula:

$$HR^2{}_2SiO(R^2{}_2SiO)_dSiR^2{}_2H$$

wherein $R^2$ denotes a monovalent hydrocarbon or halohydrocarbon radical free of aliphatic unsaturation and having from 1 to 20 carbon atoms, at least 50 percent of $R^2$ being methyl, and d has an average value of 1 to 1000;

(D) a platinum group metal-containing catalyst; and
(E) an inhibitor compound.

2. The composition according to claim 1 wherein the composition additionally comprises an organohydrogenpolysiloxane crosslinking agent, the organohydrogenpolysiloxane crosslinking agent selected from the group consisting of $(R^3{}_3SiO)_4Si$, $(MeHSiO)_4$, $R^3{}_3Si(OSiR^3{}_3)_3$, $(R^3{}_3SiO(Me_2SiO)_5)_4Si$, $(R^3{}_3SiO(MeHSiO)_7(Me_2SiO)_2)_4Si$, and an organohydrogenpolysiloxane having the general formula:

$$ZR^3{}_2SiO(Me_2SiO)_x(MeR^4SiO)_y(MeHSiO)_zSiR^3{}_2Z$$

wherein $R^3$ denotes a monovalent hydrocarbon or halohydrocarbon radical free of aliphatic unsaturation and having from 1 to 20 carbon atoms, Z denotes a hydrogen atom or an $R^3$ radical, at least 50 percent of $R^3$ being methyl, $R^4$ denotes a monovalent hydrocarbon or halohydrocarbon radical free of aliphatic unsaturation and having from 1 to 20 carbon atoms, x has an average value of 0 to 500, y has an average value of 0 to 500, and z has an average value of 1 to 100.

3. The composition according to claim 1 wherein component (A) has the general formula:

$$XMe_2SiO(MeSiO)_aSiMe_2X$$

wherein Me denotes methyl, X is a radical selected from the group consisting of vinyl and hexenyl radicals, and a has a value of from 100 to 800.

4. The composition according to claim 1 wherein component (B) has the general formula:

$$YMe_2SiO(Me_2SiO)_b(MeYSiO)_cSiMe_2Y$$

wherein Me denotes methyl, Y is a radical selected from the group consisting of vinyl and hexenyl radicals, b has a value of from 10 to 200, and c has a value of from 1 to 10.

5. The composition according to claim 1 wherein component (C) has the general formula:

$$HMe_2SiO(MeSiO)_dSiMe_2H$$

wherein Me denotes methyl, and d has a value of from 1 to 500.

6. The composition according to claim 1 wherein component (D) is a vinyl-siloxane complex of chloroplatinic acid.

7. The composition according to claim 1 wherein component (E) has the formula:

$$R^5(OQ)_tO_2CCH=CHCO_2(QO)_tR^5$$

wherein $R^5$ denotes, independently, a monovalent hydrocarbon radical having from 1 to 10 carbon atoms, each Q denotes, independently, an alkylene radical having from 2 to 4 carbon atoms, and t has a value of 0 or 1.

8. The composition according to claim 7 wherein component (E) is a maleate.

9. The composition according to claim 8 wherein the maleate is bis-methoxyisopropyl maleate.

10. The composition according to claim 7 wherein component (E) is a fumarate.

11. The composition according to claim 10 wherein the fumarate is diethyl fumarate.

12. The composition according to claim 1 wherein the composition additionally comprises a bath life extender composition.

13. The composition according to claim 12 wherein component (E) is diethyl fumarate and the bath life extender composition is benzyl alcohol.

14. The composition according to claim 2 wherein the organohydrogensiloxane crosslinking agent has the formula:

$$Me_3SiO(MeHSiO)_eSiMe_3$$

wherein e has an average value sufficient to provide a viscosity at 25° C. of from 1 to 100 millipascal-seconds.

15. The composition according to claim 14 wherein e has an average value of from 1 to 100.

16. A process for preparing a laminate of a substrate and an adhesive wherein the adhesive will release from the substrate, the process comprising the steps of:
(I) coating a curable silicone release composition on the surface of the substrate wherein the composition comprises:
(A) a polydiorganosiloxane having the general formula:

$$XR_2SiO(R_2SiO)_aSiR_2X$$

wherein R denotes a monovalent hydrocarbon or halohydrocarbon radical free of aliphatic unsaturation and having 1 to 20 carbon atoms, X denotes an olefinic hydrocarbon radical having from 2 to 20 carbon atoms, at least 50 percent of R being methyl, and a has an average value of 1 to 1000;

(B) a siloxane polymer having at least 3 silicon-bonded unsaturated organic groups per molecule and having the general formula:

$$YR^1{}_2SiO(R^1{}_2SiO)_b(R^1YSiO)_cSiR^1{}_2Y$$

wherein $R^1$ denotes a monovalent hydrocarbon or halohydrocarbon radical free of aliphatic unsaturation and having 1 to 20 carbon atoms, Y denotes an olefinic hydrocarbon radical having from 2 to 20 carbon atoms, at least 50 percent of $R^1$ being methyl, b has an average value of 1 to 500, and c has an average value of 1 to 100;

(C) a polysiloxane having the general formula:

$$HR^2{}_2SiO(R^2{}_2SiO)_d SiR^2{}_2H$$

wherein $R^2$ denotes a monovalent hydrocarbon or halohydrocarbon radical free of aliphatic unsaturation and having from 1 to 20 carbon atoms, at least 50 percent of $R^2$ being methyl, and d has an average value of 1 to 1000;
(D) a platinum group metal-containing catalyst; (E) an inhibitor compound; (II) exposing the coating to an energy source selected from the group consisting of
(i) heat and
(ii) actinic radiation in an amount sufficient to cure the coating; and
(III) applying an adhesive on the coating.

17. The process according to claim 16 wherein the process additionally comprises an organohydrogenpolysiloxane crosslinking agent, the organohydrogenpolysiloxane crosslinking agent selected from the group consisting of $(R^3{}_3SiO)_4Si$, $(MeHSiO)_4$, $R^3Si(OSiR^3{}_3)_3$, $(R^3{}_3SiO(Me_2SiO)_5)_4Si$, $(R^3{}_3SiO(MeHSiO)_7(Me_2SiO)_2)_4Si$, and an organohydrogenpolysiloxane having the general formula:

$$ZR^3{}_2SiO(Me_2SiO)_x(MeR^4SiO)_y(MeHSiO)_zSiR^3{}_2Z$$

wherein $R^3$ denotes a monovalent hydrocarbon or halohydrocarbon radical free of aliphatic unsaturation and having from 1 to 20 carbon atoms, Z denotes a hydrogen atom or an $R^3$ radical, at least 50 percent of $R^3$ being methyl, $R^4$ denotes a monovalent hydrocarbon or halohydrocarbon radical free of aliphatic unsaturation and having from 1 to 20 carbon atoms, x has an average value of 0 to 500, y has an average value of 0 to 500, and z has an average value of 1 to 100.

18. The process according to claim 16 wherein component (A) has the general formula:

$$XMe_2SiO(MeSiO)_a SiMe_2X$$

wherein Me denotes methyl, X is a radical selected from the group consisting of vinyl and hexenyl radicals, and a has a value of from 100 to 800.

19. The process according to claim 16 wherein component (B) has the general formula:

$$YMe_2SiO(Me_2SiO)_b(MeYSiO)_c SiMe_2Y$$

wherein Me denotes methyl, Y is a radical selected from the group consisting of vinyl and hexenyl radicals, b has a value of from 10 to 200, and c has a value of from 1 to 10.

20. The process according to claim 16 wherein component (C) has the general formula:

$$HMe_2SiO(MeSiO)_d SiMe_2H$$

wherein Me denotes methyl, and d has a value of from 1 to 500.

21. The process according to claim 16 wherein component (D) is a vinyl-siloxane complex of chloroplatinic acid.

22. The process according to claim 16 wherein component (E) has the formula:

$$R^5(OQ)_t O_2CCH = CHCO_2(QO)_t R^5$$

wherein $R^5$ denotes, independently, a monovalent hydrocarbon radical having from 1 to 10 carbon atoms, each Q denotes, independently, an alkylene radical having from 2 to 4 carbon atoms, and t has a value of 0 or 1.

23. The process according to claim 22 wherein component (E) is a maleate.

24. The process according to claim 23 wherein the maleate is bis-methoxyisopropyl maleate.

25. The process according to claim 22 wherein component (E) is a fumarate.

26. The process according to claim 25 wherein the fumarate is diethyl fumarate.

27. The process according to claim 16 wherein the composition additionally comprises a bath life extender composition.

28. The process according to claim 27 wherein component (E) is diethyl fumarate and the bath life extender composition is benzyl alcohol.

29. The process according to claim 17 wherein the organohydrogensiloxane crosslinking agent has the formula:

$$Me_3SiO(MeHSiO)_e SiMe_3$$

wherein e has an average value sufficient to provide a viscosity at 25° C. of from 1 to 100 millipascal-seconds.

30. The process according to claim 29 wherein e has an average value of from 1 to 100.

* * * * *